United States Patent
Lades et al.

(10) Patent No.: US 10,252,366 B2
(45) Date of Patent: Apr. 9, 2019

(54) METHOD FOR PRODUCING A PISTON FOR AN INTERNAL COMBUSTION ENGINE

(71) Applicant: Federal-Mogul Nurnberg GmbH, Nuremberg (DE)

(72) Inventors: Klaus Lades, Nuremberg (DE); Wolfram Cromme, Ezelsdorf (DE)

(73) Assignee: Federal-Mogul Nurnberg GmbH, Nurnberg (DE)

( * ) Notice: Subject to any disclaimer, the term of this patent is extended or adjusted under 35 U.S.C. 154(b) by 92 days.

(21) Appl. No.: 14/415,221

(22) PCT Filed: Jul. 10, 2013

(86) PCT No.: PCT/EP2013/064566
§ 371 (c)(1),
(2) Date: Jan. 16, 2015

(87) PCT Pub. No.: WO2014/012826
PCT Pub. Date: Jan. 23, 2014

(65) Prior Publication Data
US 2015/0174679 A1 Jun. 25, 2015

(30) Foreign Application Priority Data

Jul. 20, 2012 (DE) .................. 10 2012 212 791

(51) Int. Cl.
*B23K 9/24* (2006.01)
*B23P 15/10* (2006.01)
(Continued)

(52) U.S. Cl.
CPC ............... *B23K 9/04* (2013.01); *B23P 15/10* (2013.01); *F02F 3/003* (2013.01); *C21D 1/09* (2013.01);
(Continued)

(58) Field of Classification Search
USPC ........................................... 219/137 R
See application file for complete search history.

(56) References Cited

U.S. PATENT DOCUMENTS 3,670,089 A * 6/1972 Paton .................. C22B 9/18
164/492
3,759,148 A * 9/1973 Geffroy .................. F02F 3/00
277/451

(Continued)

FOREIGN PATENT DOCUMENTS

CN 202012408 U 10/2011
DE 3040572 A1 5/1982
(Continued)

OTHER PUBLICATIONS

N.A. Olshanskaya,Tom 1, Under the Editorship of Tzioy Draktechn Sciences; 1978.

*Primary Examiner* — Ibrahime A Abraham
*Assistant Examiner* — Gyounghyun Bae
(74) *Attorney, Agent, or Firm* — Robert L. Stearns; Dickinson Wright, PLLC

(57) ABSTRACT

In a method for producing a piston (10) for an internal combustion engine, a melt treatment is performed at least in regions in particular in the region of a combustion chamber depression (14), the depth of said melt treatment being varied in the circumferential direction.

7 Claims, 2 Drawing Sheets

(51) Int. Cl.
*F02F 3/00* (2006.01)
*B23K 9/04* (2006.01)
*C21D 1/09* (2006.01)
*F02F 3/12* (2006.01)
*F02F 3/22* (2006.01)

(52) U.S. Cl.
CPC . *F02F 3/12* (2013.01); *F02F 3/22* (2013.01); *F02F 2003/0061* (2013.01); *F02F 2200/04* (2013.01)

(56) References Cited

U.S. PATENT DOCUMENTS

| | | | | |
|---|---|---|---|---|
| 3,807,014 | A | | 4/1974 | Hummel |
| 3,933,143 | A | * | 1/1976 | Gurtler ................. F02B 23/063 123/193.6 |
| 4,360,956 | A | * | 11/1982 | Hiller .................. B23K 35/286 219/121.35 |
| 4,382,169 | A | * | 5/1983 | Rabkin ................ B23K 35/286 219/76.1 |
| 4,447,275 | A | * | 5/1984 | Hiraoka ................. F01P 11/06 123/41.72 |
| 4,483,286 | A | * | 11/1984 | Herrmann ................ F02F 3/12 123/193.6 |
| 4,720,312 | A | * | 1/1988 | Fukuizumi ............... C21D 9/30 148/512 |
| 4,761,192 | A | * | 8/1988 | Saga ...................... C21D 1/09 148/508 |
| 4,971,003 | A | * | 11/1990 | Suzuki ................ F02B 23/0603 123/193.6 |
| 5,048,398 | A | * | 9/1991 | Pfeiffenberger .......... F02F 3/02 123/193.6 |
| 5,446,258 | A | * | 8/1995 | Mordike ................. C21D 1/09 148/512 |
| 5,611,143 | A | * | 3/1997 | Graf ...................... B23P 9/00 219/62 |
| 8,181,623 | B2 | * | 5/2012 | Kemnitz ............... F16C 33/201 123/193.6 |
| 8,667,945 | B2 | * | 3/2014 | Sasaki ..................... F02F 3/10 123/193.1 |
| 2001/0003227 | A1 | * | 6/2001 | Feikus ..................... C23C 4/04 29/888.06 |
| 2004/0129243 | A1 | * | 7/2004 | Robelet ..................... B21J 5/00 123/193.6 |
| 2004/0194307 | A1 | * | 10/2004 | Barnes ................. B23K 20/129 29/888.044 |
| 2008/0078339 | A1 | * | 4/2008 | Obermeier ............... F01P 3/08 123/41.35 |
| 2008/0223211 | A1 | * | 9/2008 | Maier ...................... B05B 3/10 92/172 |
| 2009/0000470 | A1 | * | 1/2009 | Reichstein ............... C21D 1/09 92/260 |
| 2010/0154940 | A1 | * | 6/2010 | Luft ........................ C21D 1/09 148/512 |
| 2010/0232870 | A1 | * | 9/2010 | Golya ....................... F16J 1/16 403/150 |
| 2012/0180749 | A1 | * | 7/2012 | Kopchick .................. F02F 3/12 123/193.6 |
| 2012/0187110 | A1 | * | 7/2012 | Schaller ............. B23K 26/0823 219/602 |
| 2013/0263814 | A1 | * | 10/2013 | Gniesmer ........... F02B 23/0603 123/193.6 |
| 2013/0340700 | A1 | * | 12/2013 | Donahue ................. F02F 1/004 123/193.2 |
| 2014/0190010 | A1 | * | 7/2014 | Baberg ................... B23P 15/10 29/888.04 |

FOREIGN PATENT DOCUMENTS

| | | |
|---|---|---|
| DE | 4205307 01 | 8/1993 |
| DE | 102007044696 A1 | 1/2009 |
| JP | S59108849 | 6/1984 |
| JP | 03-043648 * | 2/1991 |
| JP | 03043648 A * | 2/1991 |
| RU | 2008488 C1 | 2/1994 |
| RU | 2148750 C1 | 5/2000 |

* cited by examiner

METHOD FOR PRODUCING A PISTON FOR AN INTERNAL COMBUSTION ENGINE

BACKGROUND OF THE INVENTION

1. Technical Field

The invention relates to a method for producing a piston for an internal combustion engine.

2. Related Art

The development of internal combustion engines is increasingly heading in the direction of smaller and yet higher-performance engines. High thermal and mechanical loads on the piston result therefrom, in particular in the region of the combustion chamber cavity.

To increase the loading capacity in this region of a piston, it is known from DE 30 40 572 A1, for example, to subject regions of the combustion chamber cavity to a remelt treatment to refine the structure and increase resistance to thermal or mechanical changes.

Similar methods are evident from DE 42 05 307 C1, JP 59-108849 A and CN 20 20 12408 U.

SUMMARY OF THE INVENTION

The invention is based on the object of improving, in view of efficiency while continuously fulfilling the requirements, a method for producing a piston for an internal combustion engine, in which the piston is subjected in regions to a remelt treatment.

In accordance therewith, within the framework of a method of producing a piston for an internal combustion engine, in which a remelt treatment is performed at least in regions, in particular in the region of the combustion chamber cavity, the depth thereof is altered in the circumferential direction. In other words, the resulting piston comprises zones remelted at least in regions. Within these zones, different remelt depths are found in the circumferential direction. The invention thus does not relate to different remelt depths which result in that in the circumferential direction, several "paths" of remelted structures are generated next to each other, which are more deeply remelted in a core region than in rim regions such that despite an arrangement of the individual paths as close as possible to one another, differences in depth remain in that direction in which the paths are arranged next to each other. Furthermore, the abovementioned prior art in places gives the impression that the remelt depth in directions perpendicular to the circumferential direction is less at the rim than in a central region.

In contrast to this, according to the invention the remelt depth is changed in a novel manner in the circumferential direction such that regions are found in the circumferential direction in which remelting occurred with a greater depth than in other regions. By this, in less loaded regions a lesser remelt depth can be set than in higher loaded regions such that in an advantageous manner the total heat input is decreased and the thermal ageing of the piston as a whole is reduced by the remelt process. Since a possible parameter which decreases the remelt depth is the current strength, the energy demand can be reduced. A further possible parameter is the rotational speed which at places can be increased with a lesser remelt depth. This leads to a reduction of the overall required remelt time and contributes to a reduction in costs. It is added that the remelt treatment is preferably performed by a welding process such that in particular the weld seam geometry and/or depth can be altered in the circumferential direction.

As was already indicated, the remelt depth can be varied by altering the parameters of current strength, voltage, distance of a welding electrode from the surface and/or the feed rate.

Since a combustion chamber cavity rim and/or bottom is/are (a) particularly loaded region(s), it is preferably these regions that are subjected to a remelt treatment by the method according to the invention.

In view of the regions in which a greater remelt depth is set, it is preferred at present to provide these in a plane which contains the axis of the piston pin. In particular, at present it is preferred to set the remelt depth at its greatest in this region and at its least in the direction perpendicular thereto, and to graduate the transitions between these points. The method according to the invention furthermore offers particular advantages with pistons having cooling channels, in particular if a combustion chamber cavity is offset towards the piston axis. In this case, the distance between the combustion chamber cavity and the cooling channel varies along the circumference, and in regions in which the remaining distance is particularly short, the remelt depth can be set in an advantageous manner to be less to prevent melting through to the cooling channel. The use of a remelt treatment on such pistons at said critical points in certain situations is only possible with this.

BRIEF DESCRIPTION OF THE DRAWINGS

Hereinafter, preferred embodiment examples will be explained in more detail by means of the drawings. These show.

DETAILED DESCRIPTION OF A PREFERRED EMBODIMENT OF THE INVENTION

Figure 1:
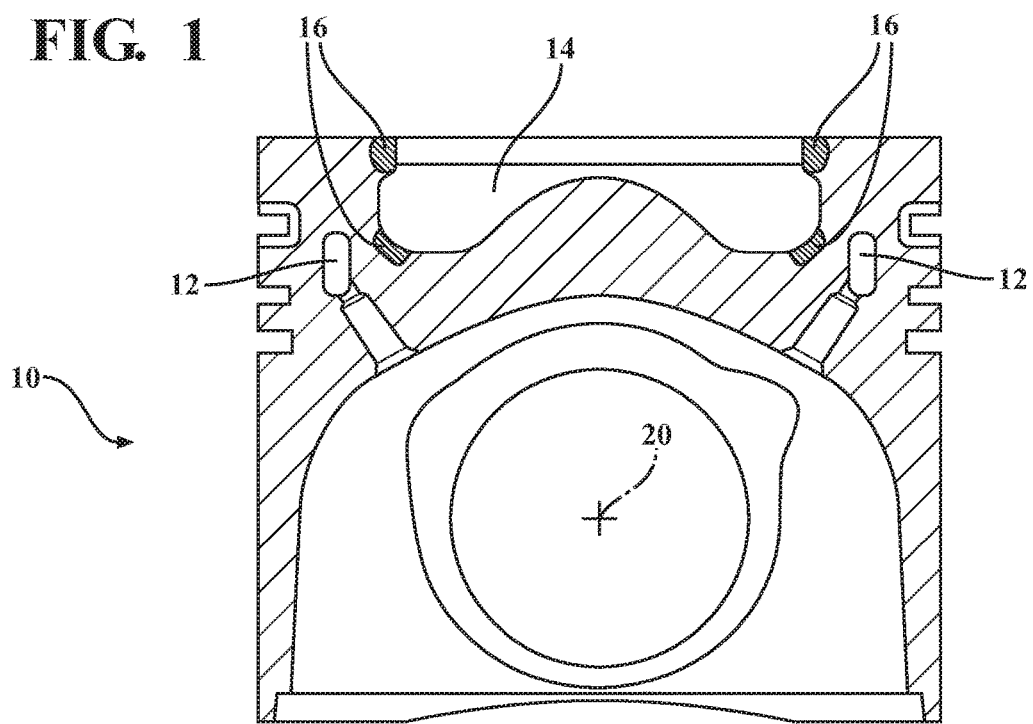
FIG. 1 a sectional view of a piston perpendicular to the piston pin axis.

In FIG. 1, in a section perpendicular to the piston pin axis, a piston 10 is represented, which exemplarily comprises a cooling channel 12 and a combustion chamber cavity 14. With 16, those regions are indicated in which, to increase the loading capacity, a remelt treatment with a certain depth was performed.

Figure 2:
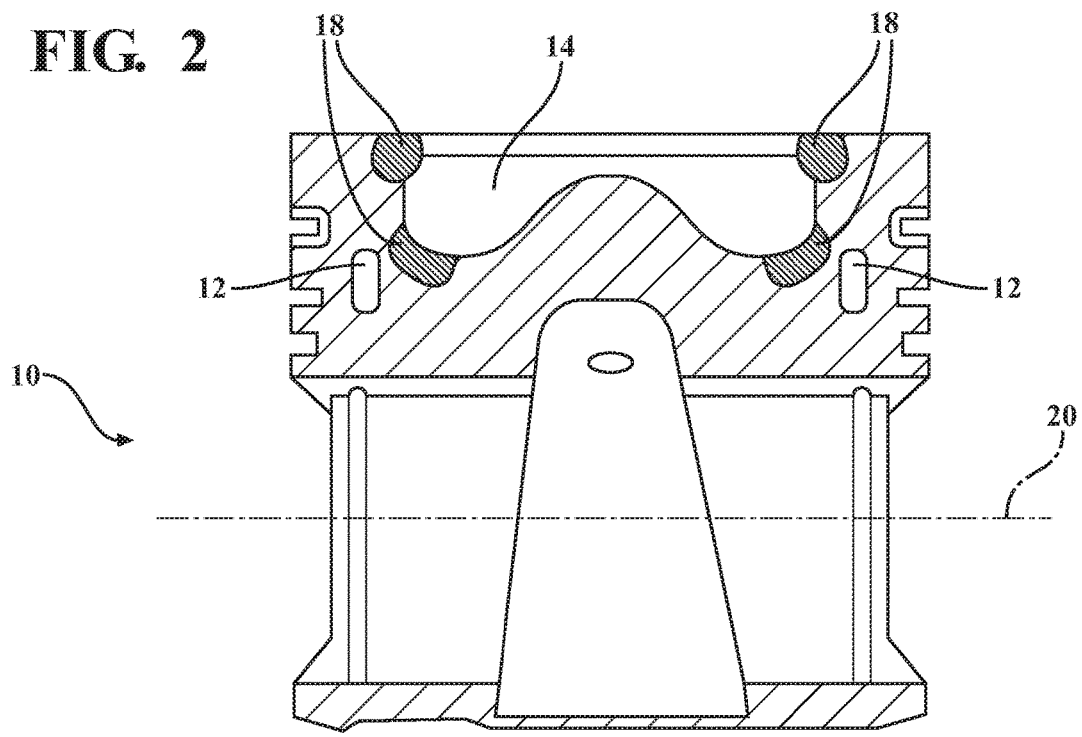
FIG. 2 a sectional view of a piston through the piston pin axis.

In comparison with FIG. 2, it is shown that these regions 18 in the sectional plane, which contains the piston pin axis 20, are configured to be deeper. In other words, the remelted zone extends into deeper regions starting from the surface. By this, a particular loading capacity is achieved in the particularly loaded regions in the vicinity of the plane which contains the piston pin axis.

Figure 3:
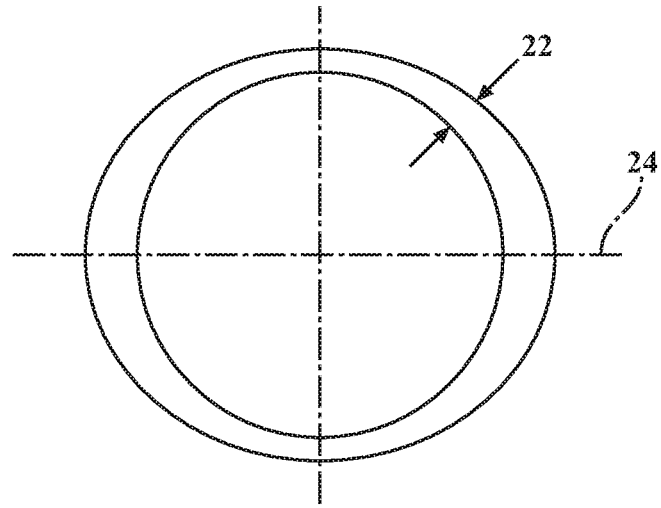
FIG. 3 a representation of the remelt depth along the circumference.

A preferred course of the remelt depth 22 along the circumference is evident from FIG. 3. The remelt depth 22 is, preferably in the region of the plane 24 which contains the piston pin axis, at the greatest and perpendicular thereto at the least, the transitions between said extremes being configured so as to be graduated.

The invention claimed is:

1. A method for producing a piston for an internal combustion engine, including loading a piston, finding a combustion chamber cavity, finding regions in the circumferential direction of the combustion chamber cavity, setting a less remelt depth in less loaded regions than in higher loaded regions such that the total heat input is decreased and the thermal aging of the piston as a whole is reduced by a remelt treatment, performing the remelt treatment performed by a welding process altering the parameters of at least one of current strength, voltage, distance of a welding electrode from a surface of the piston and the feed rate at least in regions of the piston, altering a depth of the remelt treatment in a circumferential direction so that the depth is greater in at least one circumferential location of the remelt treatment relative to the depth in other circumferential locations of the remelt treatment, wherein an angular relationship between a minimum thickness position of one of the at least one circumferential locations and a maximum thickness position of one of the other circumferential locations are perpendicular or acute-angular wherein the piston is made with the combustion chamber cavity and wherein the remelt treatment is performed in the region of the combustion chamber cavity.

2. The method according to claim 1, wherein the remelt treatment is performed on a rim of a combustion chamber cavity of the piston.

3. The method according to claim 2, wherein the remelt treatment is performed deeper in a region of a plane which contains a piston pin axis.

4. The method according to claim 2, including forming the piston with a cooling channel.

5. The method according to claim 2, wherein the remelt treatment is performed on a bottom of a combustion chamber cavity of the piston.

6. The method according to claim 1 wherein the step of altering the depth of the remelt treatment in the circumferential direction is further defined as altering the depth of the remelt treatment in the circumferential direction such that at least one portion of the remelt treatment has a first depth which is at least twice a second depth of another portion of the remelt treatment.

7. The method according to claim 1 wherein the step of altering the depth of the remelting treatment in the circumferential direction is further defined as continuously increasing the depth of the remelt treatment in the circumferential direction from a first location with a minimum depth to a second location with a maximum depth and continuously decreasing the depth of the remelt treatment from the second location to a third location with the minimum depth and continuously increasing the depth of the remelt treatment from the third location to a fourth location with the maximum depth and continuously decreasing the depth of the remelt treatment from the fourth location to the first location.

* * * * *

UNITED STATES PATENT AND TRADEMARK OFFICE
CERTIFICATE OF CORRECTION

PATENT NO. : 10,252,366 B2
APPLICATION NO. : 14/415221
DATED : April 9, 2019
INVENTOR(S) : Klaus Lades and Wolfram Cromme Page 1 of 1

It is certified that error appears in the above-identified patent and that said Letters Patent is hereby corrected as shown below:

In the Claims

Column 3, Line 24, "claim 2" should read --claim 1--

Column 4, Line 1, "claim 2" should read --claim 1--

Column 4, Line 3, "claim 2" should read --claim 1--

Signed and Sealed this
Twentieth Day of August, 2019

Andrei Iancu
*Director of the United States Patent and Trademark Office*